June 13, 1933.  C. C. BUTLER  1,913,746
BOX DUMPING MACHINE
Filed April 29, 1931   3 Sheets-Sheet 1
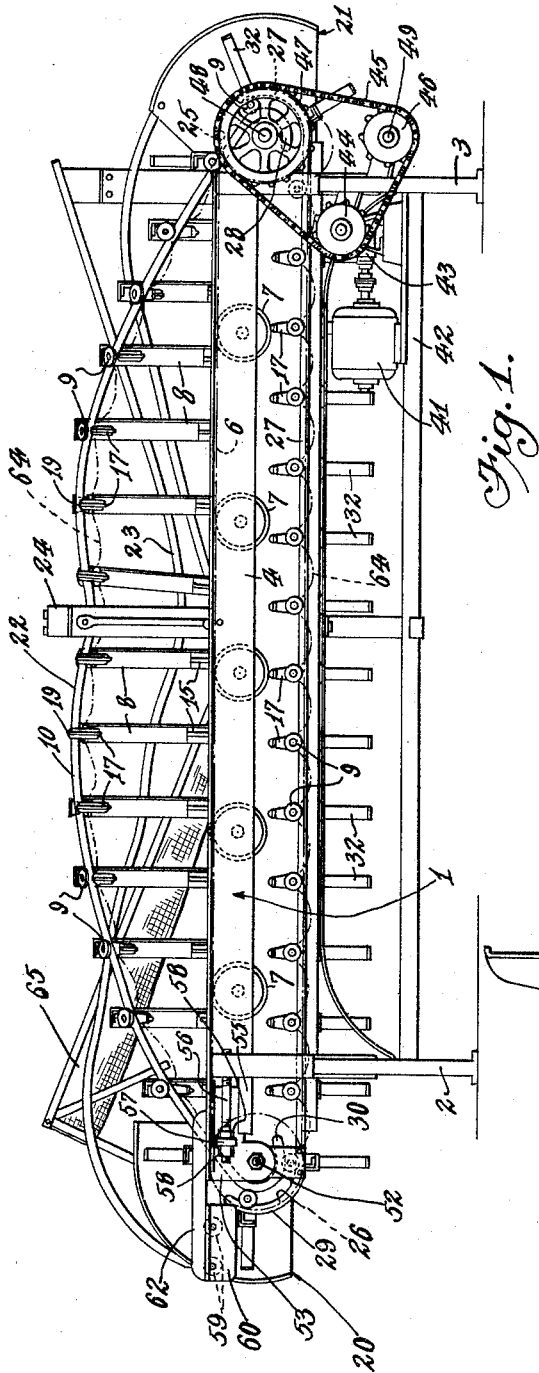
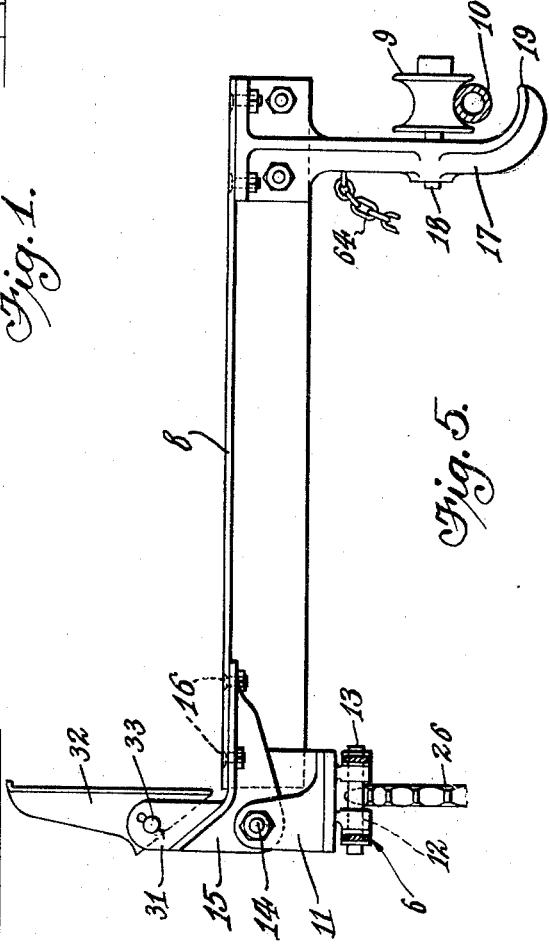
Inventor
Clinton C. Butler
By Lyon & Lyon
Attorneys

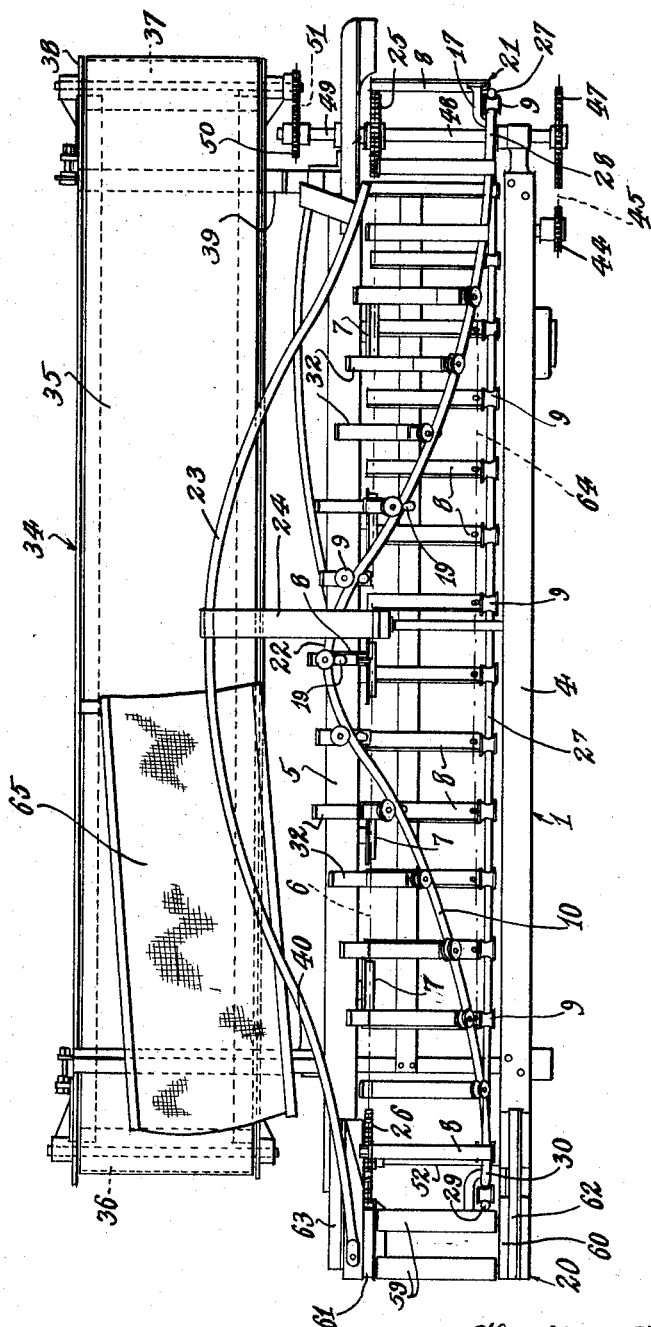

June 13, 1933.  C. C. BUTLER  1,913,746
BOX DUMPING MACHINE
Filed April 29, 1931   3 Sheets-Sheet 3

Inventor
Clinton C. Butler
By Lyon & Lyon
Attorneys

Patented June 13, 1933

1,913,746

UNITED STATES PATENT OFFICE

CLINTON C. BUTLER, OF POMONA, CALIFORNIA, ASSIGNOR TO FOOD MACHINERY CORPORATION, OF SAN JOSE, CALIFORNIA, A CORPORATION OF DELAWARE

BOX DUMPING MACHINE

Application filed April 29, 1931. Serial No. 533,651.

My invention relates to box dumping machines and has particular reference to a machine for receiving boxes filled with fruit and for inverting the same to remove the contents of the boxes after which the boxes are again righted and passed out of the machine.

In handling small pieces of material, it is common practice to collect the same in trays or boxes for the purpose of transporting them from one point to another point at which the articles are to be sorted or handled separately, and this is particularly true in the citrus fruit industry in which boxes or trays are employed for the collection of fruit as it is picked from the trees, these trays being transported to a central handling depot, at which point the fruit is to be sorted, graded, and various operations performed upon each piece of the fruit individually.

The trays are brought to the central point and awaiting further operations the trays or boxes are stacked, after which it is necessary to dump each of the boxes separately upon a suitable grading tray or conveyor upon which further operations upon the fruit may be performed.

It is an object of this invention to provide a machine into which boxes filled with fruit may be fed, the machine automatically inverting the boxes over a receiving tray or conveyor and the boxes again righted and passed out of the machine.

Another object of my invention is to provide a device for transporting a box in the longitudinal direction while at the same time inverting the box and dumping the contents thereof.

Another object of my invention is to provide a box dumping machine in which a conveyor comprising an endless chain of box supports is adapted to receive a box and move the same in a longitudinal direction while the supports pass over a track, causing the box to be inverted and dumping the contents therefrom.

Another object of the invention is to provide a box dumping machine in which the box is completely supported during its movement from an upright to an inverted position and back to the upright position after dumping the contents therefrom.

Other objects of the invention will be apparent from a study of the following specifications read in connection with the following drawings wherein Figure 1 is a front elevational view of a box dumping machine constructed in accordance with my invention;

Figure 2 is a top plan view of the box dumping machine illustrated in Fig. 1 and illustrating the conveyor upon which the contents of the boxes may be dumped;

Figure 5 is a detail view of one of the box supporting bars employed in the box dumping machine.

Figure 3:
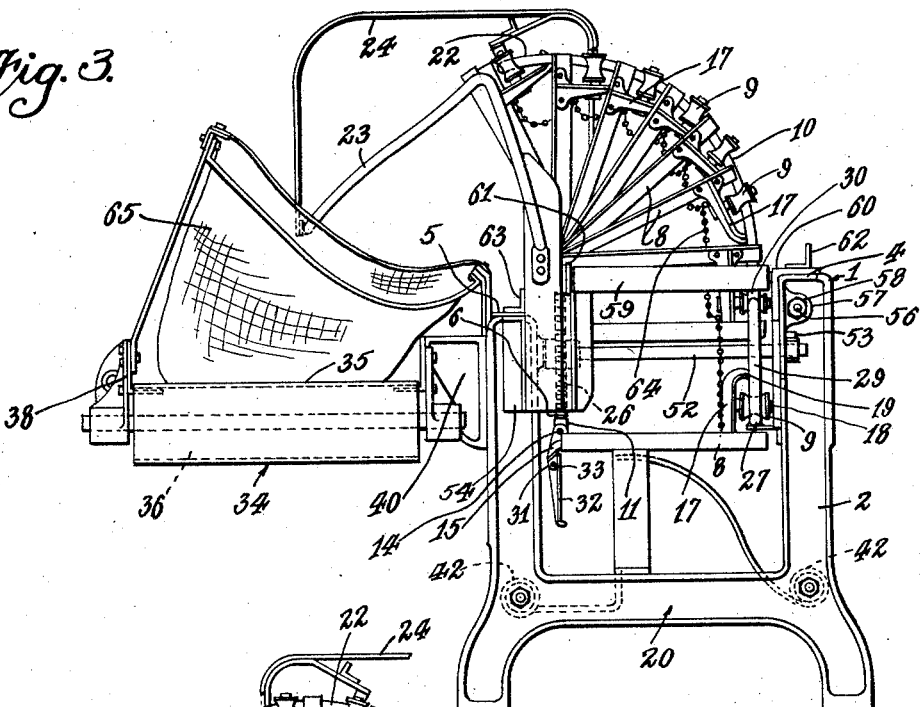
Figure 3 is a front end view of the box dumping machine illustrated in Fig. 1.

Referring to the drawings, I have illustrated in Fig. 1 a box dumping machine comprising a suitable bed 1 which may be supported in any suitable manner, as by means of a pair of leg stands 2 and 3 mounted respectively at opposite ends of the bed.

The bed 1 comprises a pair of spaced longitudinal beams 4 and 5, spaced from each other to form a frame between which an endless chain 6 may operate upon a plurality of supporting rollers or sprockets 7. The sprockets 7 are preferably mounted upon one of the longitudinal beams 5 of the bed 1 so that the chain 6 will be positioned relatively close to the beam 5.

Pivotally mounted upon the chain 6 and extending at right angles to the line of movement of the chain, I have illustrated a plurality of box supporting bars 8 which extend across the space between the bed beams 4 and 5 and constitute with the chain an endless conveyor upon which boxes may be supported and transported throughout the length of the box dumping machine.

By referring, particularly, to Fig. 2, it will be observed that the left-hand side of the bars 8 will be supported upon the chain 6 while the opposite end of each of the bars is provided with a roller 9 arranged to engage and operate upon a track 10 which extends longitudinally of the bed 1 throughout the length of the machine.

In Fig. 5 I have illustrated in detail the connection and box supporting bars 8 and the chain 6 and the the track 10. It will be observed that the chain 6 is provided with a plurality of upstanding lugs 11 pivotally mounted, as at 12, to the cross bars 13 constituting a part of the chain 6. The lugs 11 extend upwardly to receive therethrough a pin 14 pivotally mounting a bracket 15 to one leg of which the cross bar 8 is attached as by bolts 16.

The opposite end of the bar 8 is provided with a downwardly depending hook 17 through which projects a shaft 18 upon the outer end of which is mounted the roller 9 which is engaged by the upper surface of the track 10.

It will be observed that the outer end 19 of the hook 17 lies in overlapping relation with the track 10 to prevent complete disengagement of the bar 8 from the track when the bar is inverted, as will hereinafter be described.

By referring, again, to Figs. 2 and 3, it will be observed that the track 10 extends upwardly and to the right of the bed 1 so that as the chain 6 moves from the front end 20 of the machine to the rear end 21 thereof, the rollers 9 on each of the bars 8 will cause the outer ends of the bars to be raised above a horizontal position in a gradually increasing angular movement until when the bar 8 arrives at the highest point 22 of the track 10 the upper surface of the bar will have passed to a position slightly in excess of 90° from the horizontal. When the bar 8 has arrived in this position, however, the outer end 19 of the hook 17, associated therewith, will engage the track 10 and prevent further rotational movement of the bar 8.

By referring, again, particularly to Fig. 2, it will be observed that from the highest point 22 of the track 10, the track 10 continues in an inward and downward direction toward the rear end 21 of the machine so that as the bars move further along the track they are brought gradually back to their original horizontal position.

Arranged along the right hand side of the machine, is a guide track 23 which constitutes a supporting guide for the upper side of boxes which may be placed upon the machine when the bars 8 are moved from their horizontal position to a position inverting the boxes, the guide track 23 having the major portion of its length extending along the contour described by the upper right hand corner of the box as the box passes through the machine. If desired, a suitable brace 24 may be secured to the beam 5 to support the outermost extending portion of the guide track 23.

Figure 4:
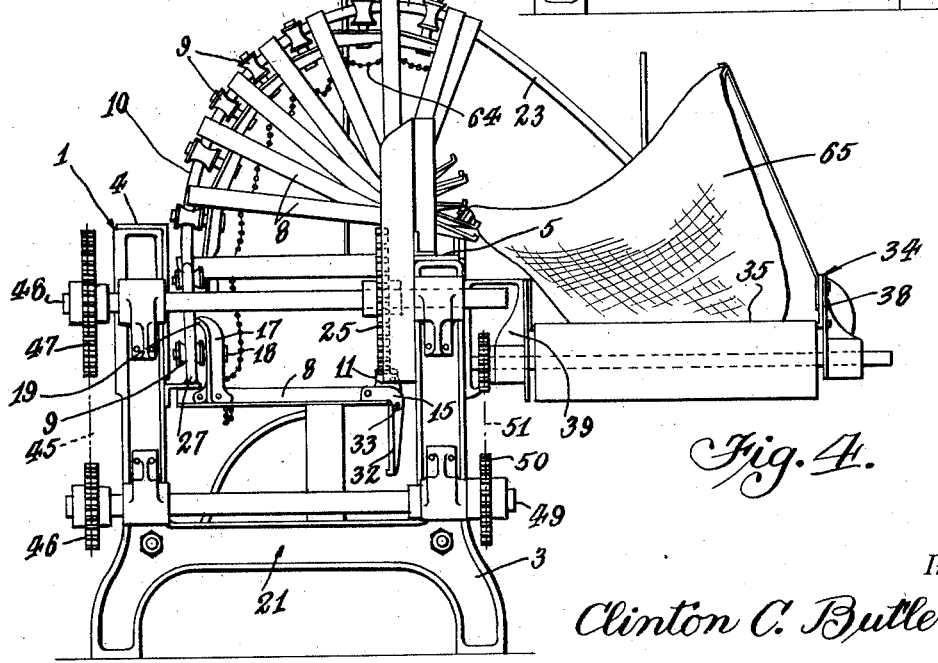
Figure 4 is a rear end view of the box dumping machine shown in Fig. 1.

By referring, particularly, to Figures 1 and 4, it will be observed that the chain 6 extends over a sprocket 25 at the rear end 21 of the machine to reverse the movement of the chain and permit it to return below the level of the bed 1. The front end 20 of the machine is likewise provided with a sprocket 26 over which the chain passes in reversing its movement at this end of the machine. As the chain 6 passes over the sprocket 25, it will be observed that the bars 8 will be inverted, and I have provided a return track 27 as extending in overlapping relation to the rear end 28 of the track 10 so that as the chain passes over the sprocket 25 the roller 9 on each of the bars 8 will engage the upper side of the return track 27 and hold the bars 8 in a substantially horizontal position during the return movement under the bed 1 of the machine. In like manner the front end 29 of the return track 27 extends upwardly and inwardly in overlapping relation with the front end 30 of the track 10 so that as the bars 8 are again inverted for movement along the upper side of the machine, the rollers 9 will engage the upper surface of the track 10 and will properly engage the track 10 as the direction of movement of the chain is again reversed.

In order to prevent the boxes from sliding sideways from the bars 8 during the inverting movement of the bars, I have provided the bracket 15 on the right hand side of the bars 8 with an upstanding leg 31 which will engage the right hand side of a box when in place upon the bar 8. In order to insure support over a considerable vertical distance along the side of such boxes, an extension 32 may be pivotally attached to the upstanding leg 31 of bracket 15 as by means of pin 33. Hence the extension 32 may move about its pivot to conform with various contours of boxes or trays in the event that such trays are not rectangular in vertical cross section.

By referring, particularly, to Fig. 2, it will be observed that a conveyor 34 extends in parallel relation with the bed 1 of the box dumping machine and is arranged in such position relative to the box dumping machine that when the boxes are inverted by the machine the contents of the boxes will be dumped upon the conveyor 34.

The conveyor 34 may be of any suitable character, though I have illustrated the same as comprising an endless chain 35 operating over end pulleys 36 and 37 at the front and rear ends of the conveyor 34, these pulleys being suitably journaled upon a frame or bed 38 constituting the base of the conveyor. The frame 38 is illustrated as being formed integrally with the box dumping machine as by supporting the frame upon suitable laterally projecting brackets 39 and 40 formed upon the bed 1 of the box dumping machine.

By referring, particularly to Fig. 1, it will be observed that the endless chain 6 and the bars 8 are driven by means of any suitable source of power, such as a motor 41 which may be mounted upon a support 42 extending between the end legs 2 and 3 constituting the base of the box dumping machine. The motor 41 is illustrated as being connected through suitable gearing 43 to drive a sprocket 44 which is connected by means of a drive chain 45 to drive a pair of sprockets 46 and 47. The sprocket 47 is mounted upon the same shaft 48 that mounts the sprocket 25 constituting the drive sprocket for the chain 6. The sprocket 46 is secured to a shaft 49 which projects laterally upon the right hand side of the box dumping machine to drive a sprocket 50 which is connected through a suitable chain 51 to drive the conveyor roller 37 so that power from the single motor 42 may be employed to drive both the box dumping machine and the conveyor 34.

By referring, particularly, to Figures 1 and 2, it will be observed that the sprocket 26 is journaled upon the shaft 52 which is supported upon a pair of movable brackets 53 and 54. These brackets are arranged to slide longitudinally of the bed 1 of the machine upon suitable tracks or guides 55, one of which is provided upon each side of the machine and are arranged to be held in any adjusted position, as by means of threaded rods 56 which extend between the leg frame 2 and a laterally projecting lug 57 formed upon the brackets 53 and 54, respectively. Suitable locknuts 58 may be provided upon the rods 56 to lock the lug 57 in any adjusted position. In this manner the sprocket 26 may be adjusted inwardly or outwardly with respect to the machine and thus take up any slack which may occur in the drive chain 6.

For the purpose of assisting the introduction of boxes into the front end of the box dumping machine, I have illustrated a pair of rollers 59 journaled between a pair of brackets 60 and 61 which may be attached to the tops of the beams 4 and 5, respectively, as by means of angle irons 62 and 63. The relative rotation of the rollers 59 is such that boxes may be placed upon these rollers and then slid forwardly to rest upon the bars 8 at the front end of the dumping machine.

The operation of my box dumping machine is as follows: The motor 41 may be started, which will start the chain 6 rotating over its endless path to cause the bars 8, which lie upon the upper side of the machine, to be moved longitudinally of the machine over the track 10.

Boxes filled with articles, such as fruit, may be placed upon the rollers 59 one at a time and slid forwardly so that the next bar 8 on the chain 6 to move upwardly over the sprocket 26 will engage the bottom of the box so placed and move the same forwardly. As the chain of bars moves forwardly the roller 9 on the bar or bars under any given box will ride upwardly upon the track 10 to lift the right hand side of the box in a gradually increasing amount until when the box arrives in the position opposite that part of the rail engaged by the reference character 22 the box will have been substantially inverted or turned upon its side to such position as will cause it to empty its contents upon the conveyor 35. During this gradual inverting movement the left hand side of the box travels parallel to the chain 6 so that this side of the box is not lifted. Also during the inverting movement, the box, as it is tipped over, engages the guide rail 23 to prevent the box from falling off the bars 8 so that after dumping the contents the box in its further movements along the dumping machine will be guided by the guide rail 23 back to its upright position so that when the box arrives at the rear end of the machine it will pass from the machine in an upright position.

The bar or bars 8 which have been supporting this box during the movement from front to rear of the machine, now pass over the sprocket 25, at which time the roller 9, associated therewith, leaves the track 10 and engages the upturned end of the lower guide rail 27 and the bar will be held in a horizontal position during the return movement of the bar underneath the machine to again pass upwardly over the sprocket 26.

For the purpose of preventing undue distortion of the bars 8 when load is placed thereon, a connecting chain 64 may be provided which interconnects adjacent bars 8 at their outer or right hand ends, the proper amount of slack being provided between each pair of adjacent bars to insure that the relative angular movement of the bars to each other will be provided for.

It will also be observed that as the objects contained in the boxes are dumped upon the conveyor 34 such articles might have a tendency to roll toward the front of the conveyor and possibly go from the front end thereof and to prevent such occurrence, as well as to assist in absorbing shock of dropping the articles upon the conveyor, a screen 65 may be provided extending forwardly and upwardly relative to the conveyor 34 in such position as will effectively block any rearward movement of the articles. This is particularly desirable when the device is to be used for handling fruit as the screen 65 may be made of a piece of relatively heavy cloth which will materially assist in absorbing the shock to the fruit as it is dropped from the box onto the conveyor.

While I have illustrated and described the preferred embodiment of my invention, I do not desire to be limited to any of the details shown or described herein, except as defined in the appended claims.

I claim:

1. In a box dumping machine a base, an endless chain mounted to move longitudinally relative to said base, a plurality of box supporting bars spaced longitudinally along said chain and extending at right angles to the direction of movement of said chain, means pivotally connecting one end of each of said bars to said chain, a track extending longitudinally of said base and spaced laterally from said chain to engage the free ends of said bars, said track having a contour supporting said bars in a substantially horizontal position at one end of said machine and for causing said bars to move laterally through an arc exceeding 90° as said bars are moved longitudinally of said machine.

2. In a box dumping machine a base, an endless chain mounted to move longitudinally relative to said base, a plurality of box supporting bars spaced longitudinally along said chain and extending at right angles to the direction of movement of said chain, means pivotally connecting one end of each of said bars to said chain, a track extending longitudinally of said base and spaced laterally from said chain to engage the underneath side of the free ends of each of said bars, said track having a contour supporting said bars in a substantially horizontal position when in front of said machine and for causing said bars to move laterally through an arc exceeding 90° as said bars are moved longitudinally of said machine, and means secured to the free end of each of said bars for engaging the underneath side of said track to hold said bars in engagement therewith when the arc exceeds 90°.

3. In a box dumping machine a base, an endless chain mounted to move longitudinally relative to said base, a plurality of box supporting bars spaced longitudinally along said chain and extending at right angles to the direction of movement of said chain, means pivotally connecting one end of each of said bars to said chain, a track extending longitudinally of said base and spaced laterally from said chain to engage the underneath side of the free ends of each of said bars, said track having a contour supporting said bars in a substantially horizontal position when in front of said machine and for causing said bars to move laterally through an arc exceeding 90° as said bars are moved longitudinally of said machine, and means secured to the free end of said bars to hold said bars in engagement with said track when the arc exceeds 90° and means formed upon the pivoted end of each of said bars for engaging the side of a box placed thereon to support the box when said bars move through said arc.

4. In a box dumping machine a base, an endless chain mounted to move longitudinally relative to said base, a plurality of box supporting bars pivotally connected to said chain and extending at right angles to the direction of movement of said chain, a track extending longitudinally of said base for engaging said bars at a point spaced from said chain, said track having a contour supporting said bars in a substantially horizontal position at one end of said machine and for causing said bars to move through an arc exceeding 90° as said bars are moved longitudinally of said machine, and a guide track extending longitudinally of said machine to engage the upper side of the box when said bars move through said arc.

5. In a box dumping machine a base, an endless chain mounted to move longitudinally relative to said base, a plurality of box supporting bars pivotally connected to said chain and extending at right angles to the direction of movement of said chain, a track extending longitudinally of said base for engaging said bars at a point spaced from said chain, said track having a contour supporting said bars in a substantially horizontal position at each end of said machine and for causing said bars to move through an arc exceeding 90° as said bars are moved longitudinally of said machine, and a guide track spaced from said bar track for engaging the upper side of said box and having a contour preventing said box from falling from said bars when said bars are moved from their horizontal position and for guiding the said box back to horizontal position as said bars are restored to the horizontal.

6. In a box dumping machine a base, an endless chain mounted to move longitudinally relative to said base, a plurality of box supporting bars each pivotally secured at one of its ends to said chain and extending at right angles to the direction of movement of said chain, a roller secured to the free end of each of said bars, a track extending longitudinally of said base for engaging the underside of each of said rollers and having a contour supporting said bars in a substantially horizontal position at one end of said machine and for causing said bars to move laterally through an arc exceeding 90° as said bars are moved longitudinally of said machine.

7. In a box dumping machine a base, an endless chain mounted to move longitudinally relative to said base, a plurality of box supporting bars each pivotally secured at one of its ends to said chain and extending at right angles to the direction of movement of said chain, a roller secured to the free end of each of said bars, a track extending longitudinally of said base for engaging the underside of each of said rollers and having a contour supporting said bars in a substantially horizontal position at one end of said machine and for causing said bars to move laterally through an arc exceeding 90° as said bars are moved longitudinally of said machine, and means secured to the free end of said bars and engaging the underneath side of said track when said bars are moved through the said arc to prevent said bars from falling from said track.

8. In a box dumping machine a base, an endless chain mounted to move longitudinally relative to said base, a plurality of box supporting bars pivotally connected to said chain and extending at right angles to the direction of movement of said chain, a track extending longitudinally of said base for engaging said bars at a point spaced from said chain, said track having a contour supporting said bars in a substantially horizontal position at one end of said machine and for causing said bars to move through an arc exceeding 90° as said bars are moved longitudinally of said machine, and a spacer chain interconnecting the free ends of each of said bars to prevent longitudinal movement of the free ends of said bars relative to each other.

Signed at Pomona, California, this 10th day of April, 1931.

CLINTON C. BUTLER.